(12) United States Patent
Epstein

(10) Patent No.: US 6,493,073 B2
(45) Date of Patent: Dec. 10, 2002

(54) SYSTEM AND METHOD FOR MEASURING PROPERTIES OF AN OPTICAL COMPONENT

(76) Inventor: Sheldon L. Epstein, P.O. Box 400, Wilmette, IL (US) 60091-0400

( * ) Notice: Subject to any disclaimer, the term of this patent is extended or adjusted under 35 U.S.C. 154(b) by 184 days.

(21) Appl. No.: 09/734,974

(22) Filed: Dec. 11, 2000

(65) Prior Publication Data

US 2002/0071111 A1 Jun. 13, 2002

(51) Int. Cl.$^7$ .................................................. G01B 9/00
(52) U.S. Cl. ........................................................ 356/124
(58) Field of Search ................................ 356/124–127; 382/4, 45, 276, 293, 296, 295, 124

(56) References Cited

U.S. PATENT DOCUMENTS

| | | | |
|---|---|---|---|
| 4,303,341 A | * 12/1981 | Kleinknecht et al. | 250/550 |
| 4,408,884 A | * 10/1983 | Kleinknecht et al. | 356/243.4 |
| 5,119,434 A | * 6/1992 | Bishop et al. | 348/126 |
| 5,243,542 A | 9/1993 | Noguchi | |
| 5,307,141 A | 4/1994 | Fujieda | |
| 5,406,375 A | 4/1995 | Brandstetter | |
| 5,440,383 A | 8/1995 | Bacchus | |
| 5,581,347 A | 12/1996 | Le Saux et al. | |
| 5,613,013 A | * 3/1997 | Schuette | 356/400 |
| 5,872,625 A | 2/1999 | Kajino et al. | |
| 5,973,773 A | 10/1999 | Kobayashi | |
| 6,102,544 A | 8/2000 | Baudart et al. | |

OTHER PUBLICATIONS

Oster & Nishijima, Moire Patterns, Scientific American, May 1963, pp. 54–63.

Kafri et al, The Physics of Moire Metrology, 1990, pp. 36–37, 58–136, 174–194 John Wiley & Sons, New York, NY, USA.

AMIDROR, The Theory of the Moiré Phenomenon, Kluwer Academic Publishers, Norwell MA, pp. 57–58 (Problem 2–27—Testing lenses) & pp 249–352; ©2000.

* cited by examiner

Primary Examiner—Michael Stafira
(74) Attorney, Agent, or Firm—Sheldon L. Epstein

(57) ABSTRACT

A system for measuring properties of an optical component, such as a progressive, multifocal ophthalmic spectacle lens comprises a design having a set of concentric circles, means for recording images of the design directly and through the optical component in a computer memory, means for superimposing the images to form a moiré-effect pattern and a method for analyzing the pattern to measure a property (e.g., powers) of the optical component that includes a comparison of a portion of the pattern generated with the component with a portion of a pattern generated by a master component.

30 Claims, 2 Drawing Sheets

SYSTEM AND METHOD FOR MEASURING PROPERTIES OF AN OPTICAL COMPONENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention is in the field of optical component measuring and testing and, more particularly, is in the domain of quantitative measurement of lens and mirror power and other optical characteristics.

2. Description of the Prior Art

Optical components for precision applications, such as lenses and mirrors, are now being mass-produced in ever increasing quantities. Many are made by molding monomeric or polymeric materials such as polycarbonates. Some of these materials are cured by heat or exposure to ultraviolet light. Because the molding and curing steps in the manufacturing process cannot be controlled as tightly as required by specifications for new lenses, a need has arisen for a new system and method for measuring properties of optical components at production-line speeds.

One type of precision optical component being manufactured in ever-increasing quantities is the soft contact lens. A high-speed cosmetic defect detection system for contact lenses is taught in European Patent No. EP0882969; however, this system cannot measure power or other optical properties.

Another high-volume precision ophthalmic product is the progressive multifocal ophthalmic spectacle lens of the type described in U.S. Pat. No. 6,102,544. FIG. 1 of that patent is a diagrammatical front view of a progressive multifocal ophthalmic lens comprising three regions of different power. These regions are defined in that patent as a far vision region VL, a near vision region, VP and an intermediate region between the two other regions, VI. The '544 patent defines a reference point for measuring far vision power, L, and a reference point for measuring near vision power, P. The powers measured at reference points L and P define major properties of these lenses.

Progressive spectacle lenses are manufactured at rates of approximately one per second. They are ejected from molding machines in random orientations of the reference points for far vision L and near vision P. This complicates the task of measuring powers at reference points L and P.

Prior art lens meters commonly used at manufacturing sites are manually operated instruments. They can be classified as those that a] measure refraction of one or more beams of light (e.g. U.S. Pat. No. 5,489,978) or b] generate patterns. Of the later, there are some that generate moiré-effect patterns, (e.g. U.S. Pat. No. 5,872,625).

Moiré-effect patterns are generated by superimposing a repetitive design, such as a grid, on the same or a different design in order to produce a pattern distinct from its component designs. Examples are described in Amidror, *The Theory of the Moiré Phenomenon*, Kluwer Academic Publishers, Norwell, Mass. ©2000. Problem 2–27. Testing lenses cites Oster & Nishijima, "Moiré Patterns", *Scientific American*, May 1963, pp. 54–63, that contains an example of moire-effect rotation when positive and negative optical lenses are placed between a pair of linear-ruled plates.

In order to use a conventional lens meter, an operator first must orient each lens with respect to a lens meter. Then, the operator must make two separate measurements—one for far vision (base) power at reference point L and another for near vision (add) power at reference point P on a lens before the lens is packaged. Each of these two measurements must be accurate to within ⅛ diopter to be commercially useful. However, the accuracy of the measurement can be degraded if an operator selects a measurement point other than L or P. This can readily happen for lenses with low add powers at reference points P or if the inspector has a visual acuity deficiency. Manual inspection is not economical for such high-speed inspection because it is too slow, because human inspectors are prone to making biased judgments and because inspection results among different inspectors are not uniform.

One principal obstacle to automatic inspection of optical components has been the difficulty of generating rapidly a comprehensive map of component optical properties, such as power at each point on the component's optical surface.

Another principal obstacle to automatic inspection of optical components has been the requirement that the component be oriented in a preferred position before measurements can be obtained with instruments—such as lensometers—of the prior art.

BRIEF SUMMARY OF THE INVENTION

It is therefore an object of the present invention to provide a robust in situ system and method for measuring properties, such as power, of optical components, such as lenses and mirrors.

A second object of this invention is to provide a system and method for measuring properties of an optical component without requiring that the component be rotationally oriented in a preferred position about its optical axis before measurements can be obtained.

A third object of this invention is to provide a system and method for generating rapidly a comprehensive moiré-effect map of component optical properties, such as power at each point on the component's optical surface.

A fourth object of this invention is to provide an accurate system and method for analyzing maps of component optical properties so as to be able to measure power and other variables for the entire component.

DETAILED DESCRIPTION OF THE INVENTION

Figure 1:
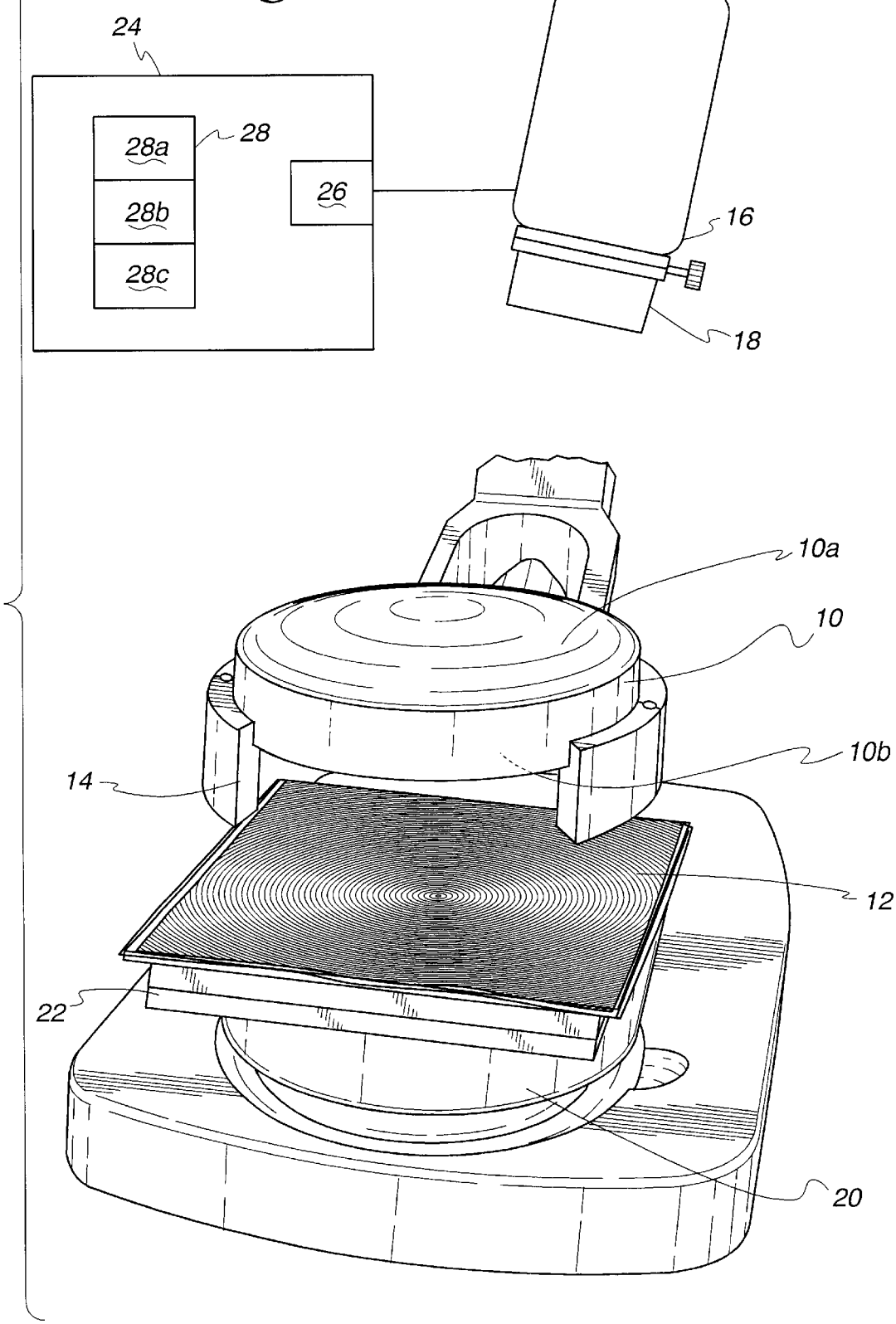
FIG. 1 is a schematic view of an embodiment of this invention used for measuring the optical properties of a progressive, multifocal ophthalmic spectacle lens.

FIG. 1 is a schematic view of a preferred embodiment of this invention used for measuring the optical properties of a progressive, multifocal ophthalmic spectacle lens 10. For this example, the lens 10 selected is for the left eye and has an 82 mm diameter. It was molded for 1.75 diopter base power and 1.50 diopter add power (ESSILOR® NATURAL® Premium Progressive Lens <www.essilorusa.com>).

The lens 10 has a base or front convex curve 10a and a back concave curve 10b. It also has regions VL, VP and VI (not shown in FIG. 1—see U.S. Pat. No. 6,102,544—FIG. 1 for an example.). The lens 10 is positioned over a design 12 by means for aligning the optical component with the design 12—in this case a robotic pincer 14 that positions the center of lens 10 over the center of the design 12 at a pedetermined distance from the design 12. The distance typically is an inverse function of base power of lens 10. The distance between the lens 10 and the design 12 of this embodiment is approximately 40 mm, which is less than (approximately 1/10 of) the focal length of the average of the base power and add power of the lens. One feature of this invention that distinguishes it from conventional lens meters and similar instruments is that the rotational orientation of lens 10 about its center can be random.

A CCD video camera (SONY® XC-7500 <www.sony.com>) 16 and camera lens (NKON® PC-NIKKOR 35 mm f/2.8 architectural lens <www.nikonusa.com>) 18 are centered above lens 10 and design 12 so that the camera 18 can capture a view of the entire lens base curve 10a. The camera lens 18 was selected because it contains a vernier adjustment that allows its optical elements to move laterally relative to the body of camera 16 in a manner that facilitates alignment. The vernier adjustment is a convenient tool; however, camera lenses that lack this feature will also provide very satisfactory results.

The design 12 was made of paper and sandwiched between thin plates of glass to maintain a flat surface. The design 12 was then mounted above a fluorescent ring illuminator (STOCKER & YALE® STEADYLIGH™ <www.stkr.com>) 20. A frosted glass plate 22 was inserted between the ring illuminator 20 and the design 12 to diffuse light into a more uniform intensity across the design 12.

The camera 16 is connected to a computer (K9APE® Machine Vision Inspection System <www.k9ape.com>) 24 through an image capture board (EPIX® PIXCI® SV4 <www.epixinc.com>) 26 installed in the bus (not shown) of the computer 24. The image capture board 26 converts analog video signals from the camera 16 into digital data (in this case 8-bit pixel data in the range $0 \leq$ pixel data $\leq 255$, where pixel data=0 is associated with black and pixel data=255 is associated with white) that can be stored in memory 28 of computer 24. Similarly a camera that generates digital signals (SILICON VWEO® <www.siliconvideo.com>) could be used in conjunction with a compatible image capture board (EPIX® PIXCI® D <www.epixinc.com>).

The memory 28 is shown in FIG. 1 as divided into three sections; namely a first memory 28a, a second memory 28b, and a result memory 28c. In this embodiment, all of memory 28 resides in random access memory (not shown) that also includes a section for program execution (not shown) in the computer 24. However, one or more of the sections of memory 28 could reside in other devices—such as a hard drive (not shown) or a remote storage device (not shown) connected via a network (not shown) to the computer 24, in other embodiments of this invention.

Figure 2:
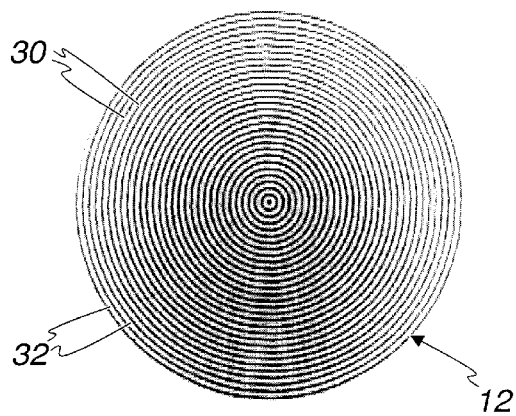
FIG. 2 is an image of a design for generating a moire-effect pattern.

FIG. 2 is an image of the design 12. The design 12 contains a set of concentric black rings 30 and white rings 32. The design 12 is approximately 100 mm in diameter and the rings 30 and 32 are approximately 0.5 mm wide. Note that the reproduction of the image in FIG. 2 is not an exact replica of the design 12 because of limitations of the printer used to produce FIG. 2. The same is true for FIGS. 3 and 4.

The design 12 is easily and inexpensively made with the following process. First, a 1000-pixel square image was created in a computer memory (not shown) with imaging software (EPIX® XCAP™ <www.epixinc.com>) programmed to execute instructions to produce the set of concentric rings. In this embodiment, the instructions are:

$$\text{ifel}((\text{sqrt}(((x-500)^2)+((y-500)^2))\%10<5),0,255), -500 \leq x \leq +500 \text{ and } -500 \leq y \leq +500$$

Each pixel in the assigned a value of either 0 (black) or 255 (white) depending on if or else its location satisfies the condition $$\text{sqrt}(((x-500)^2)+((y-500)^2))\%10<5$$

where the operator %10 means modulo base$_{10}$ division. The image then consists of a set of black and white elliptical (circular, in this embodiment) rings. Other elliptical patterns or other ring widths for other lenses and mirrors can readily be obtained by changing the instructions.

Next, the image was printed using a photographic-quality printer (HEWLITT-PACKARD® P1100 PhotoSmar™ printer <www.hp.com>) on relatively light permeable, photographic-quality paper (HEWLITT-PACKARD® HP Premium Plus glossy photo paper). After printing, the dark rings 30 are relatively light impermeable—thus rapidly providing a high-contrast design 12 at low cost.

The operation of the system will now be described.

Figure 3:
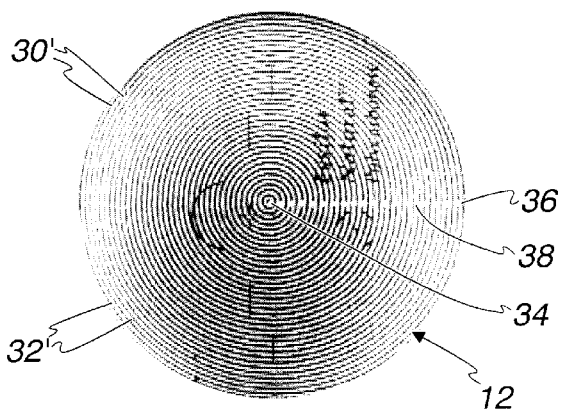
FIG. 3 is an image of the design of FIG. 2 as viewed through a progressive multifocal spectacle lens.
Figure 4:
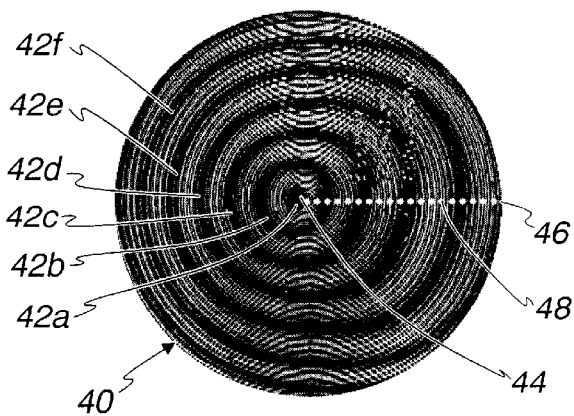
FIG. 4 is an image generated as a result of digitally superimposing the image of FIG. 2 on the image of FIG. 3.

First, means for recording an image of the design 12 in a first memory 28a, comprising camera 16 and image capture board 26, record the image of the design 12 in the first memory 28a. This is done before lens 10 is moved over the design 12 or after it is removed. It is also possible to execute a computer program similar to that taught above to make a design 12 for writing an image directly to the first memory 28a without capturing an image of the design 12 with camera 16. Second, the center of the progressive multifocal ophthalmic spectacle lens 10 is aligned over the center of the design 12 by the robotic pincer 14. Then, means for recording an image of the design 12 as deflected by the optical component (lens 10) in a second memory 28b record an image of the design of FIG. 2 as viewed through the spectacle lens 10 after it is centered over the design 12. These means also comprise camera 16 and image capture board 26. FIG. 3 is a copy of the image stored in second memory 28b. A feature of the invention that distinguishes it from other instruments is that because the lens 10 can be placed close to the design 12, the image of FIG. 3 is in sharp focus just as is the case for the image of FIG. 2. Note that rings 30' and 32' of FIG. 3 are different from rings 30 and 32 of FIG. 2 because light coming from the design 12 to the camera 16 is deflected by the spectacle lens 10. The center 34 and a point on periphery 36 define a radius line 38. The purpose of the radius line 38 will be described later. Third, means for generating a result image 40 that is formed by superimposing the image in the first memory 28*a* and the image in the second memory 28*b* yield a result image as shown in FIG. 4. The result image is a moire-effect pattern generated as a result of digitally superimposing the image of FIG. 2 stored in the first memory 28*a* with the image of FIG. 3 stored in the second memory 28*b*. In this embodiment, the superimposing function is achieved by digitally subtracting the image of FIG. 2, pixel-by-pixel, from the image of FIG. 3 subject to the condition that for all three images:

$$0 \leq \text{pixel data} \leq 255.$$

This condition is achieved by truncating any pixel data difference that is negative to zero. Other mathematical functions and conditions can be incorporated to obtain useful result moiré-effect images.

There are equivalent means for generating the result image 40 of FIG. 4 within the scope of this invention. For example, an alternative means for recording an image of the design 12 into memory 28*a* is to program the computer 24 to execute a program stored in memory 28*a* for generating a design on a graphics display (e.g., a cathode ray tube or liquid crystal display) that can be substituted for the paper design 12.

The result image 40 of FIG. 4 comprises a set of black rings or bands 42*a*, 42*b*, 42*c*, 42*d*, 42*e* and 42*f* (collectively identified as black rings or bands 42) that form a prominent part of a moiré-effect signature or map of optical properties (e.g. power) of the spectacle lens 10. The result images for other types of optical components may comprise other forms of images that are not rings and therefore the term bands is used to define both rings, lines and other shapes. The result image 40 of FIG. 4 is stored in result memory 28*c* in this embodiment for convenience. It would be equally practical to overwrite second memory 28*b*, another part of memory or a disk drive with the result image 40.

The result image 40 of FIG. 4 is a moiré-effect pattern; however, it is generated by an entirely different system and process from those that have been used to make moire-effect patterns. For example, see U.S. Pat. No. 4,639,132, which teaches the use of a pair of linear gratings (Ronchi rulings) fixed apart from one another at a known distance and used with collimated light as part of a system for mapping radiation deflection. Conventional moiré-effect patterns are obtained by passing light through a lens under test and then first and second gratings of the pair onto a screen or camera. Alignment of the pair of gratings and their separation distance is critical to the result. The present invention does not require collimated light or a pair of gratings—such as Ronchi rulings-to obtain its result images 40 of the type shown in FIG. 4 nor does it require critical displacement of lens 10 from gratings—as need by conventional lens meters and similar instruments. The shapes of and radial distances between each of the black rings 42*a* . . . 42*f* are functions of the optical properties of lens 10. The next steps describe both a method and means for analyzing the result image and the black rings 42*a* . . . 42*f* to determine the properties of the optical component in this embodiment of the invention.

Figure 5:
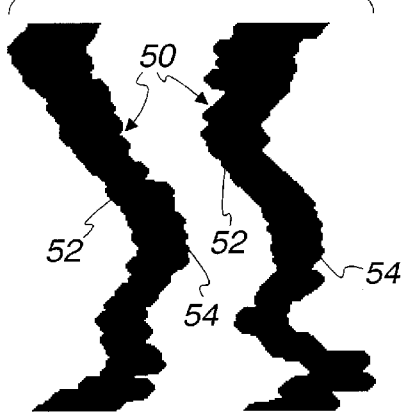
FIG. 5 is an image generated by mapping a portion of the image of FIG. 4 from a radial coordinate system to a Cartesian coordinate system.

Fourth, the image of FIG. 4 is mapped from a radial coordinate system to a Cartesian coordinate system to produce the image shown in FIG. 5. While it is possible to analyze the result image in FIG. 4 for optical properties such as power, the semi-elliptical nature of rings 42 suggests the need to use of polar mathematical functions.

Digital computer memories can be more rapidly and easily analyzed using Cartesian mathematical functions. Therefore, this step of the embodiment comprises a mapping function written in the C++ programming language to convert the rings 42 of FIG. 4 to sinuous bands 50 in FIG. 5.

The process of converting the rings 42 to the sinuous bands 50 begins by locating coordinates for center 44 and coordinates for pixels forming periphery or circle 46 of the result image 40 in FIG. 4. Next, the result image is low-pass filtered to remove the finer rings from result image 40. Then the result image is thresholded so that the image memory pixels for the dark rings 40 are set to 0 (black) while all of the other pixels are set to 255 (white).

After thresholding, mapping to Cartesian coordinates continues by sequentially reading (radial) lines 48 from the center 44 to the pixels on the (circumference) periphery 46. The starting point on the periphery 46 may be arbitrary if the rotational orientation of the lens 10 is not known. As will be shown below, a correction for rotation orientation can be made.

The number of pixels read, r, for each (radial) line 48 will vary for each position along the periphery 46 because the image of FIG. 4 is stored in Cartesian coordinates in memory 28. Therefore it is advisable to extrapolate the contents of each line to a fixed length, f. One method of extrapolation is pixel-replication, that is replicating every $n^{th}$ pixel where $$f > \max(r) \text{ and } n \approx (f-r-1)$$

where max(r) is the maximum value of r returned for all of the lines 48. After each line is read and pixel-replicated to fixed length f, the line is sequentially added or written as the next horizontal line to the image of FIG. 5. For reasons described in U.S. Pat. No. 6,102,544, power measurement for multifocal progressive spectacle lenses should be made near the circumference of a 20 mm radius circle about the center of the lens 10; however, another selected path may be desirable for other lenses or mirrors. Thus in this embodiment, only the rings 42*c* and 42*d* of FIG. 4 are mapped into the sinuous bands 50 of FIG. 5.

The sinuous bands 50 image of FIG. 5 for a master lens should be recorded before proceeding with analysis of production lenses. Note that the master lens can been imaged so that the radius line 38 of FIG. 3 passes through the portion of the lens where the base power is a maximum.

Figure 6:
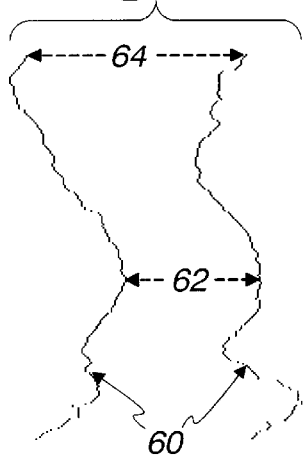
FIG. 6 is an image generated by morphologically processing the image of FIG. 5.

Fifth, the sinuous bands 50 image of FIG. 5 are processed with a morphological skeleton algorithm that replaces each of the sinuous bands 50 of FIG. 5 with sinuous lines 60 of FIG. 6. The skeleton algorithm does this by locating the approximate medial distance between left boundaries 52 and right boundaries 54 of each of the sinuous bands 50 of FIG. 5.

Sixth, FIG. 6 can now be analyzed to determine the base (minimum) and add (maximum) power of lens 10 for measuring far vision power and near vision power. This is done by measuring distance at narrowest point 62 and distance at widest point 64 between the sinuous lines 60. The distance at the narrowest point 62 is related to the base power reference point L) while the distance at widest point 64 is related to the sum of the base power and the add power (reference point P) of the lens 10.

As noted above, lens 10 may be placed at any arbitrary rotational orientation about its axis. One feature of this invention is that the order of the horizontal lines in FIG. 6 can be changed to match the orientation of the lens 10. Once the narrowest point 62 or the widest point 64 has been identified, then the horizontal line that contains one of these points can be made the top horizontal line of the image in FIG. 6. Next, all of the other lines of FIG. 6 can be rewritten in sequence below it. In this embodiment, the line containing the widest point 64 was made to be the top line. Then the image of FIG. 5 was re-sequenced in the same manner so that the horizontal line in FIG. 5 that corresponded to the top horizontal line in FIG. 6 was made to be the top horizontal line in FIG. 5.

A set of ten semi-finished, multifocal progressive spectacle lens 10 identified by the manufacturer as molded for a base power of 1.75 diopter and add powers a range between 0.75 to 3.00 diopter, inclusive, was measured by this embodiment. (N.B. that semi-finished lenses in this set actually had powers of ~5.50 diopter less than that identified because the back curves 10b had not yet been ground by an optician.). Calibration equations derived from measurements taken at narrowest points 62 and widest points 64 for the each member of the set of lens 10 were:

$$P_{base}=0.03658*d_{62}-(6.39*10^{-005})*d_{62}^2-0.4156P_{base+add}=$$
$$0.03658*d_{64}-(6.39*10^{-005})*d_{64}^2-0.4156P_{add}=P_{base+add}-P_{base}$$

where:

$P_{base}$ is the base power corresponding to the power at reference point L, $P_{base+add}$ is the combined base plus add power corresponding to the power at reference point P, $P_{add}$ is the add power at reference point P, $d_{62}$ is the distance 62 taken at the narrowest point between sinuous lines 60, and $d_{64}$ is the distance 64 taken at the widest point between sinuous lines 60.

These quadratic equations calculated base and add powers as identified by the manufacturer based upon measurements of $d_{62}$ and $d_{64}$ independent of the rotational orientation of each lens 10 around its center. Polynomial equations containing terms having degrees greater than 2 can improve precision.

One alternative to measuring properties of an optical component by measuring the distances at narrowest points 62 and widest points 64 is to measure the sinuousness of one or more optical bands.

Figure 7:
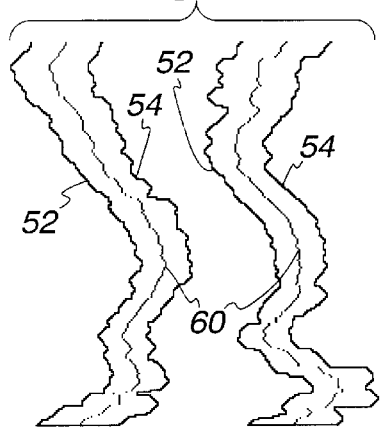
FIG. 7 is an image generated by combining FIG. 5 with FIG. 6.

FIG. 7 is an image generated by combining the left boundaries 52 and right boundaries 54 of each of the sinuous bands 50 of FIG. 5 that had been recorded for the master lens (see fourth step) with the sinuous lines 60 of FIG. 6. The reason for this is to be able to compare each sinuous line 60 for a series of production lenses 10 with an image of a master lens for that particular power and style of lens. Recall that an image of master lens 10 had been recorded so that radius line 38 passes through the portion of the lens where the base power is a maximum. If production lens 10 has the same power and style as its master lens, then pixels of the sinuous lines 60 will fall within the boundaries 52 and 54 of the sinuous bands 50. A comparison of the optical characteristics of production lenses 10 with those of another lens—such as a master lens—is readily achieved. If the production lens 10 differs from its master lens, then some of the pixels of sinuous lines 60 will fall outside the boundaries 52 and 54 of sinuous bands 50. Since the total number of pixels in the sinuous lines 60 that are within and without the boundaries 52 and 54 of the sinuous bands can easily be counted, a performance index based on these data can be constructed to gage whether a production lens 10 meets the specifications of its master lens 10. This method of comparison will differentiate left-eye ophthalmic lenses from right-eye ophthalmic lenses having the same powers.

The preferred embodiment of this system and method for measuring properties of an optical component has been described for use with progressive, multifocal ophthalmic spectacle lenses. Other embodiments can be constructed to measure properties of other optical components within the scope of the invention as defined by the following claims.

I claim:

1. A system for measuring properties of an optical component comprising:
   a. a design containing a set of rings;
   b. means for recording an image of the design in a first memory;
   c. means for recording an image of the design as deflected by the optical component in a second memory;
   d. means for generating a result image that is formed by superimposing the image in the first memory and the image in the second memory; and
   e. means for analyzing the result image to determine the properties of the optical component.

2. The system in claim 1 wherein the rings of the design are concentric rings.

3. The system in claim 1 wherein means for generating the result image comprise means for subtracting the image in one memory from the image in the other memory.

4. The system of claim 1 wherein means for recording comprise:
   a. a video camera for capturing a view of the optical component; and
   b. means for storing video signals from the camera into the memories.

5. The system of claim 1 wherein means for analyzing the result image to determine the properties of the optical component measure powers near a selected path.

6. The system of claim 5 wherein the measured powers are maximum and minimum powers.

7. The system of claim 1 wherein means for analyzing the result image comprise means for mapping the result image from a radial coordinate system to a Cartesian coordinate system.

8. The system of claim 1 wherein means for analyzing the result image comprises means for measuring distances between bands in the result image.

9. The system of claim 8 wherein means for analyzing the result image comprises means for comparing bands of one lens with bands of another lens.

10. The system of claim 1 where:
    a. the design comprises a set of concentric rings;
    b. means for recording comprises:
       i. a video camera for capturing a view of the optical component; and
       ii. means for storing video signals from the camera into the memories
    c. means for generating the result image comprise means for subtracting the image in one memory from the image in the other memory; and
    d. means for analyzing the result image to determine the properties of the optical component comprises:
       i. means for mapping the result image from a radial coordinate system to a Cartesian coordinate system,
       ii. means for measuring distances between bands in the result image,
       iii. means for comparing bands of one lens with bands from another lens, and
       iv. means for measuring maximum and minimum powers near a selected path.

11. A method for measuring properties of an optical component comprising:
    a. recording an image of a design containing a set of rings in a first memory;

b. recording an image of the design as deflected by the optical component in a second memory;

c. generating a result image containing moiré-effect bands that is formed by superimposing the image in the first memory and the image in the second memory; and d. measuring distances between the bands of the result image to determine properties of the optical component.

12. The method of claim 11 wherein the function of superimposing comprises subtracting the image in one memory from the image in the other memory.

13. The method of claim 11 wherein the step of measuring distances between the bands includes mapping the bands from a radial coordinate system to a Cartesian coordinate system.

14. The method of claim 11 wherein the step of measuring distances between the bands includes measurement of powers near a selected path.

15. The method of claim 14 wherein the step of measuring distances between the bands includes computing maximum and minimum powers as a function of the maximum and minimum distances between bands.

16. The method of claim 11 wherein the step of measuring distances between the bands includes comparing bands of one optical component with bands of another optical component.

17. The method of claim 11 wherein the rings are concentric.

18. The method of claim 11 wherein:

a. the function of superimposing comprises subtracting the image in one memory from the image in the other memory; and b. the step of measuring distances between the bands includes measurement of powers near a selected path by computing maximum and minimum powers as a function of the maximum and minimum distances between bands.

19. The method of claim 18 wherein the step of measuring distances between the bands includes comparing bands of optical component with bands of another optical component.

20. The method of claim 18 wherein:

a. the rings are concentric;

b. the step of measuring distances between the bands includes comparing bands of one optical component with bands of another optical component; and c. the function used to compute powers is a polynomial equation.

21. In a system for measuring properties of an optical component having a design containing a set of rings and means for recording an image of the design as deflected by the optical component in a second memory, an improvement comprising:

a. means for recording an image of the design in a first memory;

b. means for generating a result image that is formed by superimposing the image in the first memory and the image in the second memory; and c. means for analyzing the result image to determine the properties of the optical component.

22. The invention of claim 21 wherein the rings of the design are concentric rings.

23. The invention of claim 21 wherein means for generating the result image comprise means for subtracting the image in one memory from the image in the other memory.

24. The invention of claim 21 wherein means for recording comprise:

a. a video camera for capturing a view of the optical component; and b. means for storing video signals from the camera into the memories.

25. The invention of claim 21 wherein means for analyzing the result image to determine the properties of the optical component measure powers near a selected path.

26. The invention of claim 25 wherein the measured powers are maximum and minimum powers.

27. The invention of claim 21 wherein means for analyzing the result image comprise means for mapping the result image from a radial coordinate system to a Cartesian coordinate system.

28. The invention of claim 21 wherein means for analyzing the result image comprises means for measuring distances between bands in the result image.

29. The invention of claim 21 wherein means for analyzing the result image comprises means for comparing bands of one optical component with bands of another optical component.

30. The invention of claim 21 wherein:

a. the design comprises a set of concentric rings;

b. means for recording comprise:
  i. a video camera for capturing a view of the optical component; an d
  ii. means for storing video signals from the camera into the memories c. means for generating the result image comprise means for subtracting the image in one memory from the image in the other memory; and d. means for analyzing the result image to determine the properties of the optical component comprise:
  i. means for mapping the result image from a radial coordinate system to a Cartesian coordinate system,
  ii. means for measuring distance s between bands in the result image,
  iii. means for comparing bands of one lens with bands from another lens, and
  iv. means for measuring maximum and minimum powers near a selected path.

* * * * *